(12) United States Patent
Rey et al.

(10) Patent No.: US 6,492,861 B2
(45) Date of Patent: Dec. 10, 2002

(54) ELECTRONIC CHARGE PUMP DEVICE

(75) Inventors: Olivier Rey, Lignières (CH); Christian Bonjour, Lignières (CH)

(73) Assignee: EM Microelectronic-Marin SA (CH)

( * ) Notice: Subject to any disclaimer, the term of this patent is extended or adjusted under 35 U.S.C. 154(b) by 0 days.

(21) Appl. No.: 09/775,603

(22) Filed: Feb. 5, 2001

(65) Prior Publication Data

US 2001/0015672 A1 Aug. 23, 2001

(30) Foreign Application Priority Data

Feb. 9, 2000 (EP) .............................. 00102692

(51) Int. Cl.$^7$ .............................. G05F 1/10; G05F 3/02
(52) U.S. Cl. ..................................................... 327/536
(58) Field of Search ................................. 327/536, 537

(56) References Cited

U.S. PATENT DOCUMENTS

| | | | |
|---|---|---|---|
| 4,734,599 A | 3/1988 | Bohac, Jr. ................... 325/356 |
| 5,798,915 A | 8/1998 | Thomsen ..................... 363/60 |
| 5,973,979 A | 10/1999 | Chang et al. ................ 365/226 |
| 6,198,342 B1 * | 3/2001 | Kawai ........................ 327/534 |
| 6,255,896 B1 * | 7/2001 | Li et al. ..................... 327/536 |
| 6,366,158 B1 * | 4/2002 | Zeng et al. .................. 327/536 |

FOREIGN PATENT DOCUMENTS

WO        99/03192        1/1999

* cited by examiner

Primary Examiner—Terry D. Cunningham
Assistant Examiner—Quan Tra
(74) Attorney, Agent, or Firm—Griffin & Szipl, P.C.

(57) ABSTRACT

The charge pump device includes, in a cascade arrangement, a plurality of stages (1 to N) for transferring a potential charge from one stage to the next in response to clock signals (PHI, PA, PHINOT, PB), each stage including, arranged between an input ($A_i$) and an output ($A_{i+1}$), a switching circuit (100, 200) and a storage capacitor (Ca; Cb). Each switching circuit is formed of a first transistor (110; 130) and a second transistor (120; 140), the drains of the first and second transistors being connected to the input ($A_i$) of the stage, the source of the first transistor (110; 130) being connected to the gate of the second transistor (120; 140) and the source of the second transistor being connected to output ($A_{i+1}$) of the stage and to the gate of the first transistor. At each of the stages (1 to N) there are provided starting-up means (300; 400; 500) for keeping said second transistor (120, 140) in a non conducting state between two activation cycles of said charge pump device.

4 Claims, 5 Drawing Sheets

ELECTRONIC CHARGE PUMP DEVICE

The present invention concerns a charge pump device including, in a cascade arrangement, a plurality of stages for transferring a potential charge from one stage to the next in response to clock signals. Each stage includes, arranged between an input and an output of the latter, a switching circuit and a storage capacitor. The switching circuit is formed of a first transistor mounted with a second transistor, the drains of the first and second transistors being connected to the input of the stage, the source of the first transistor being connected to the gate of the second transistor and the source of the second transistor being connected to output of the stage and to the gate of the first transistor. The gate of the second transistor is controlled by one of the clock signals, for example via a capacitor.

A charge pump of the Dickson type is commonly used in devices such as EEPROMs, for example, which require a important voltage increase to be obtained from a relatively low available voltage. A Dickson type charge pump is essentially formed of a plurality of stages arranged in a cascade. Each stage of the pump includes an active device which leads the current in a single direction and a storage capacitor. FIG. 1 shows an example of another embodiment of a charge pump. Stages 1 to N are connected to each other in a cascade arrangement by an active switching device 10, 20 formed of two transistors 11, 12.

The choice of using a circuit with two transistors rather than a simple diode connected transistor (the drain is connected to the gate) prevents voltage drops in the charge pump due to the inherent threshold voltage effects of diode connected transistors. Indeed, for a diode connected transistor, the threshold voltage can be 2 volts or more, thus limiting a minimum exploitable voltage Vin to 2 volts or more.

Switching circuit 10, 20 is controlled by clock signals PA, Pb via a capacitor Co which reduces the voltage drop in the switching circuit. The charge pump thus has an almost ideal multiplication factor, which allows. a higher output voltage Vout to be obtained. This charge pump is conventionally controlled by a quadriphase clock with non interlaced signals PHI, PA, PHINOT, PB as illustrated in FIG. 2. The charge pump is activated by applying the four clock signals PHI, PA, PHINOT, PB to the plurality of stages 1 to N. When the boosted voltage Vout is no longer required, the pump is deactivated by stopping the application of the clock signals or by a device which interrupts the supply of boosted output signal Vout.

The operating mode of the charge pump is explained with reference to FIGS. 3 and 4. It is assumed that all the internal nodes of switching device 10, 20 are at zero potential before the pump is started-up.

FIG. 3 shows the configuration of the stage during an active sequence CPA of clock signal PHI. Transistor 11 is in a non conducting state (OFF) which prevents the current flowing and transistor 12 is in a conducting state (ON) authorizing the current to pass. In this configuration, the potential $VA_i$ at node $A_i$ is equivalent to the potential $VA_{i+1}$ at node $A_{i+1}$. This first sequence corresponds to a boosting phase of potentials $VA_i$ and $VA_{i+1}$, depending on the capacitive charge of capacitor Cb which flows through transistor 12 in capacitor Ca.

FIG. 4 shows the configuration of a stage of the pump during an inactive phase $\overline{CPA}$ of clock signal PHI. Transistor 11 is in the conducting state, while transistor 12 is in the non conducting state preventing the current from flowing from node $A_i$ to node $A_{i+1}$. In this configuration, potential $VA_i$ at node $A_i$ is equivalent to potential Vc at node c which is the junction point of the source of transistor 11 with the gate of transistor 12.

These two sequences are alternately achieved on the even and odd stages to supply at the chain output a boosted voltage Vout which corresponds to an input value Vin plus a certain number of times a value approaching the peak voltage of clock signals PHI and PHINOT.

Such regular operation of the charge pump can only be implemented on condition that the internal nodes of switching device 10 are initially at a zero potential. However, in practice, certain internal nodes in the plurality of capacitive stages N keep voltage potentials having values comprised between 0 volt and Vout after a pump charge sequence. This causes problems when the pump is next started-up which leads to deterioration in the increase in signal Vin in most cases and to no increase in signal Vin in the worst cases. Indeed, in the worst cases, the node c in one or more stages stores a voltage across capacitance Co greater than potential $VA_{i+1}$ of node $A_{i+1}$ which polarises transistor 12 in the conducting state. Thus, node $A_{i+1}$ is at a potential $VA_{i+1}$ close to potential $VA_i$ of node $A_i$. Given that potential $VA_{i+1}$ plays the role of control voltage for transistor 11, the latter remains in the non conducting state thus preventing any discharge of potential Vc of node c in the circuit. Consequently, in this case, the pump cannot be started-up normally the next time since one or more stages permanently remains blocked in the configuration shown in FIG. 3, which results in a transfer of alternating charge between capacitors Ca and Cb, preventing the effect of the charge pump from being produced.

FIG. 5 illustrates two consecutive charge cycles D1 and D2. The first charge cycle D1 shows the pump starting-up in ideal conditions, i.e. without any charged internal node while the second consecutive cycle D2 shows the charge degradation in the pump when the latter has stored potentials in its internal nodes during the preceding charge cycle D1.

This type of charge pump is also known from U.S. Pat. No. 4,734,599. This Patent discloses a charge pump using PMOS transistors similar to that shown in FIG. 1. The effect of the charge pump is reversed. Output voltage Vout is a negative high voltage, which does not change the general operating principle of the pump.

A PMOS transistor is in a conducting state when the potential of its gate is less than the potential of its source by at least a threshold voltage (Vt) of the transistor. This threshold voltage depends in particular on the voltage applied to the source of the transistor. Thus, Vt may vary approximately between 0.7 volt and 3 volts respectively, for a low voltage applied to the transistor source, of the order of one volt, and for a high voltage applied to the transistor source, of the order of ten or so volts.

As in the aforementioned prior art, voltage potentials are kept in certain circuit nodes. However, as a result of the high amplitude of the clock signals used, in particular 5 volts as suggested in this document, the potential of the gate of transistor 11 is always made less than the potential of its source during the associated clock signal pulse, whatever the effective threshold voltage of the transistor in the aforementioned range. Since transistor 11 is in a conducting state, potential Vc is brought to potential $VA_i$ which allows transistor 12 to be in a non conducting state.

However, the solution provided by this document does not resolve the problem of starting-up for clock signals of smaller amplitude, in particular less than 3 volts. Indeed, one of the permanent concerns of those skilled in the art is to consume as little energy as possible in numerous low consumption devices. This is why, clock signals having a peak voltage of less than 3 volts are preferably used, for example between 1.5 and 2 volts. In these energy saving conditions, the charge pump device of U.S. Pat. No. 4,734,599 has the same drawbacks as the aforecited prior art.

The object of the present invention is to overcome the aforecited drawbacks of the prior art and, in particular, to provide a charge pump device which re-establishes, between each activation of the pump, the potential conditions required for optimum operation of the switching circuit upon starting-up and with reduced energy consumption.

These objects are achieved as a result of a charge pump device as defined hereinbefore and characterized in that at least one of the stages further includes starting-up means at a junction node c of the source of the first transistor with the gate of the second transistor having a potential Vc, said starting-up means being arranged for keeping the second transistor in a non conducting state between two charge cycles of the charge pump device.

Thus, the ideal starting-up conditions of the charge pump are achieved and the charge incidents of the prior art are thus avoided.

Preferably, the charge pump device according to the invention includes a plurality of stages, each being provided with starting-up means.

More particularly, when the charge pump device according to the invention operates in forward current, the starting-up means include means for keeping the potential Vc of node c at a value less than or equal to that of a potential at the stage output.

Consequently, the junction node of the source of the first transistor with the gate of the second transistor is kept at a lower potential value than that of the source of said second transistor, which keeps the latter in a non conducting state between two activations of the pump.

Thus, if the charge pump device according to the invention operates in reverse current, the starting-up means include means for keeping the potential Vc of node c at a value which is higher than or equal to that of a potential at the stage output. The junction node of the first transistor source with the gate of the second transistor is kept at a higher potential value than that of its source, which keeps the second transistor in a non conducting state between two activations of the pump.

In a first embodiment of the invention operating in forward current, the starting-up means include a switch arranged between the junction node and an earth terminal. Advantageously, the junction node is then discharged of its potential.

According to a second embodiment, the starting-up means include a switch arranged between the junction node and the stage output. The minimum condition for keeping the second transistor in a non conducting state is then achieved.

In an embodiment operating in reverse current, the starting-up means include a switch arranged between the junction node and a positive potential source. The switching circuit and the starting-up means are then suited to the charge pump according to the invention for operation in reverse current.

The charge pump according to the invention may include first and second transistors of any of the following type: bipolar or junction, junction field effect (FET) or insulated gate field effect (MOS).

According to a variant of the invention, the starting-up means include a resistor arranged between the switch and the earth potential. A resistive connection between the junction node and the earth potential is then established.

Other features and advantages of the invention will appear from the following description of particular embodiments of the invention, given by way of non limiting examples, with reference to the annexed drawings, in which:

FIG. 1, already described, is an electric diagram of a charge pump device according to the prior art;

FIGS. 1 to 5 have already been described in relation to the prior art.

Figure 6:
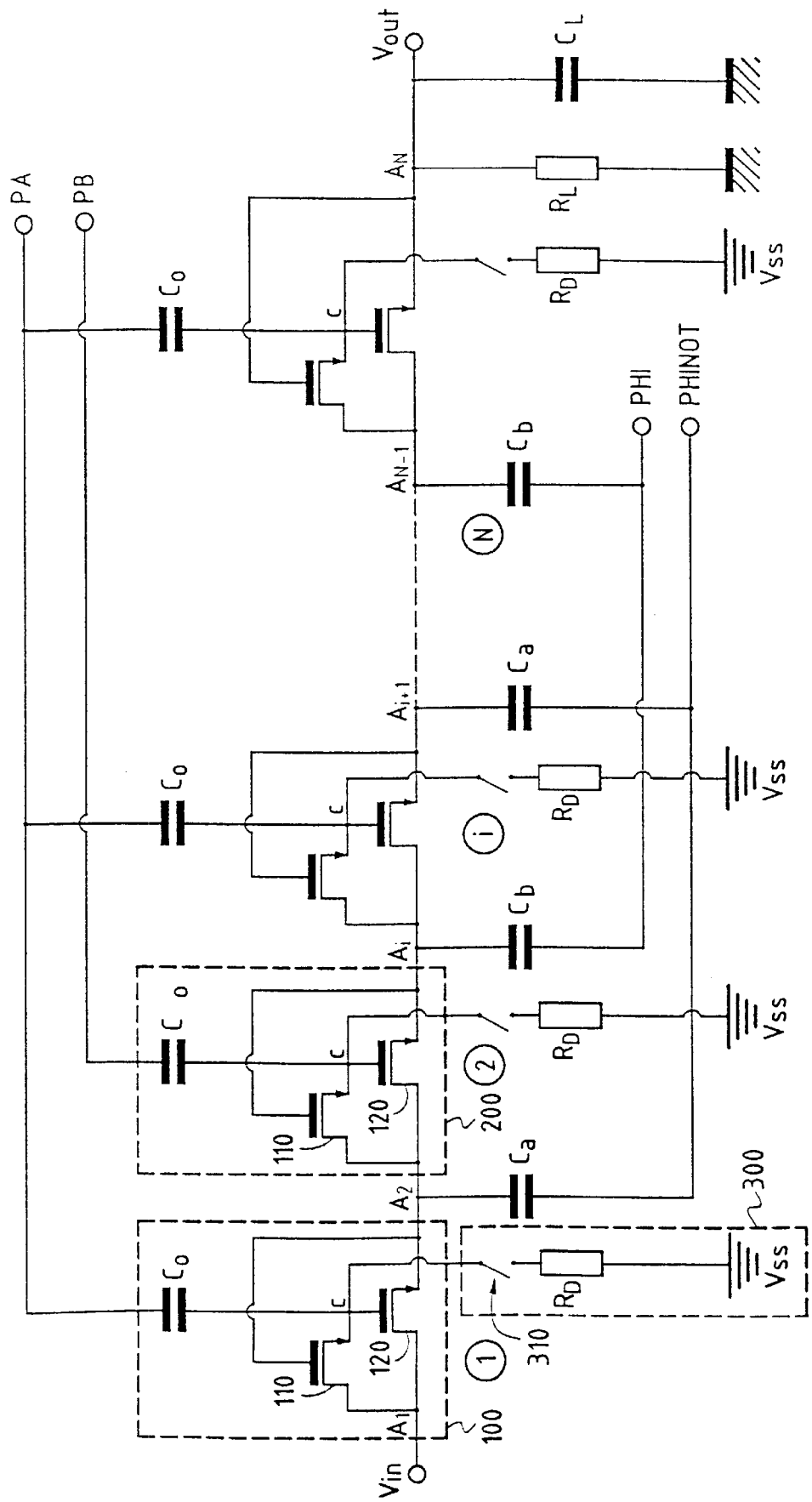
FIG. 6 is an electric diagram of a charge pump device according to a first embodiment of the invention.

FIG. 6 shows a charge pump according to the invention including elements of the charge pump described in relation to the prior art and complementary starting-up means 300 according to a first embodiment. The charge pump includes, in particular, a plurality of charges 1 to N arranged in a cascade mode, each including, in a known manner, a switching circuit 100, 200 and a capacitor Ca, Cb, the switching circuit being formed by the connection of a first transistor 110 and a second transistor 120. The pump charge is effected in a conventional manner in response to non interlaced quadriphase clock signals PHI, PA, PHINOT, PB. Advantageously, for the sake of energy saving, these signals will have a peak voltage of less than 3 volts or substantially equal to this value.

Starting-up means 300 include a switch 310 connected on one side to a junction node c of the source of the first transistor 110 with the gate of the second transistor 120 and on the other side to an earth terminal $V_{SS}$. Thus, the charge pump has available means for protecting the starting-up of the pump, before each activation phase thereof. Indeed, since node c is discharged of its potential in earth terminal $V_{SS}$ by closing switch 310, second transistor 120 can then be placed in a reliable non conducting state before the pump is started-up as potential Vc at node c is then less than or equal to a potential $VA_{i+1}$ at node $A_{i+1}$ which corresponds to the potential of the source of second transistor 120. With such means for protecting the starting-up of the pump, an optimum pump charge is guaranteed each time. These starting-up means 300 intervene between two activations of the pump, switch 310 can then be controlled by a device which allows it to be determined whether a boosted voltage Vout is required at the output of the pump or not. The switch is activated (ON) preferably between each activation cycle of the charge pump device. It is deactivated (OFF) each time that this device is activated to supply a boosted voltage at output. Preferably, all the switches are activated simultaneously using a control signal supplied by an electronic circuit arranged to control these switches. Moreover, a resistor $R_D$ can be arranged between switch 310 and the earth terminal $V_{SS}$ to establish a resistive connection between potential Vc at node c and earth terminal $V_{SS}$.

It will be noted that in another embodiment, a high value resistor without a switch is provided to form the starting-up means.

Figure 1:
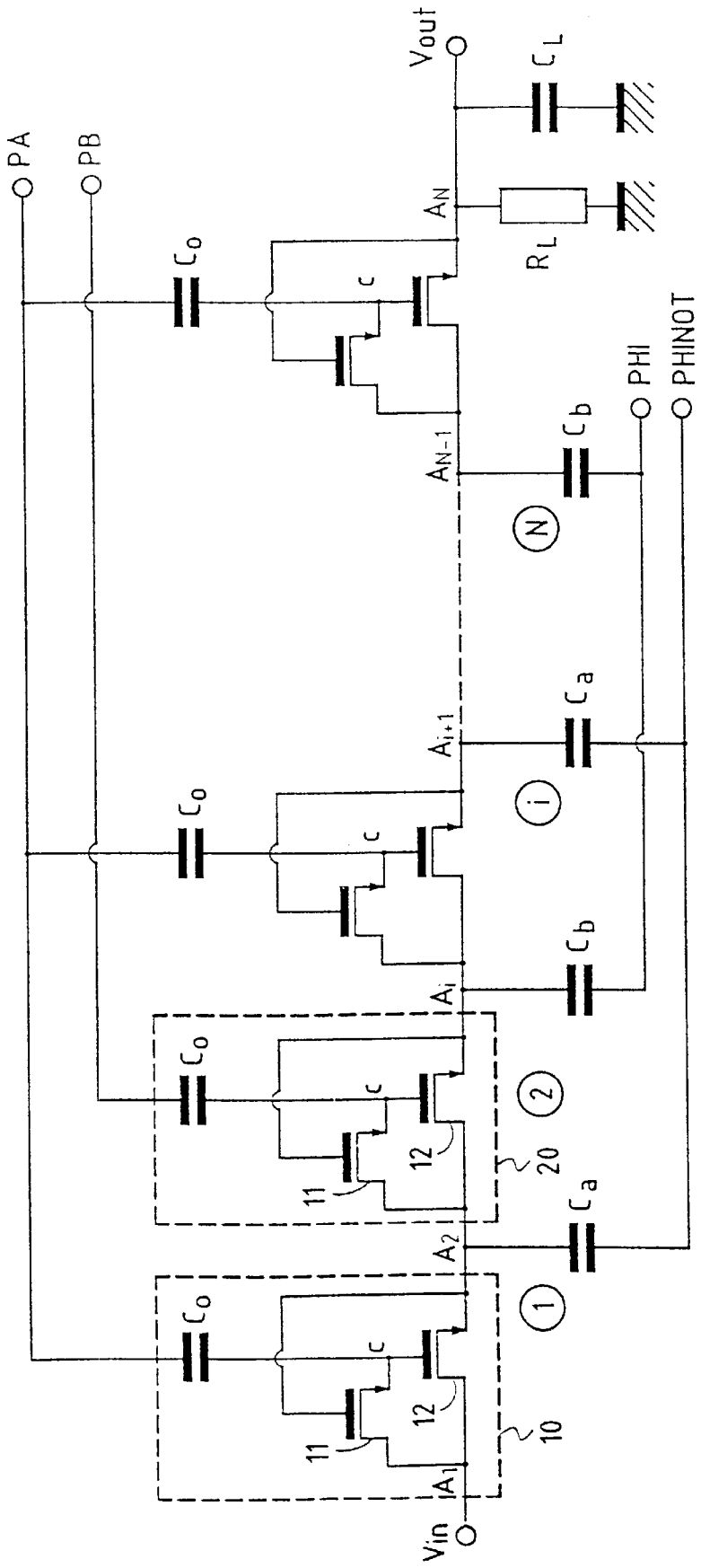
Figure 2:
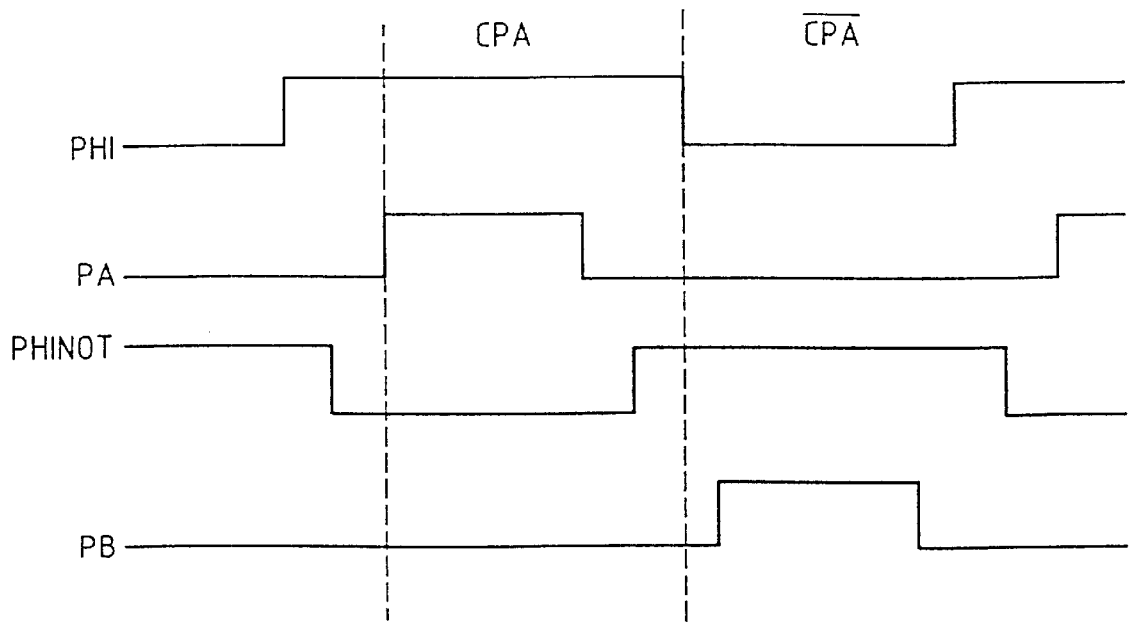
FIG. 2 is a diagram representing the control clock signals of the charge pump of FIG. 1.
Figure 3:
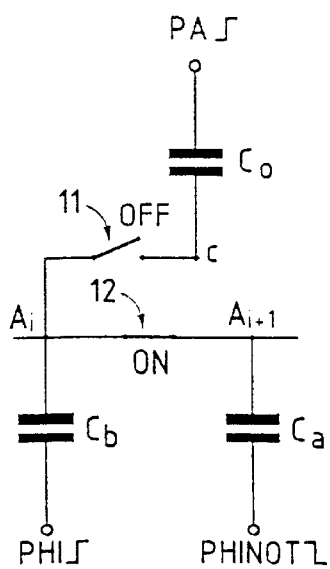
FIG. 3 is an electric diagram of a first operating configuration of a stage of the charge pump of FIG. 1.
Figure 4:
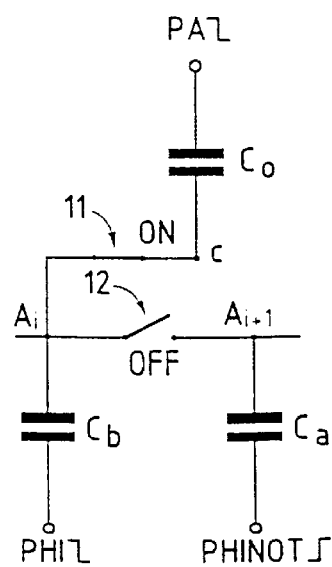
FIG. 4 is an electric diagram of a second operating configuration of a stage of the charge pump of FIG. 1.
Figure 5:
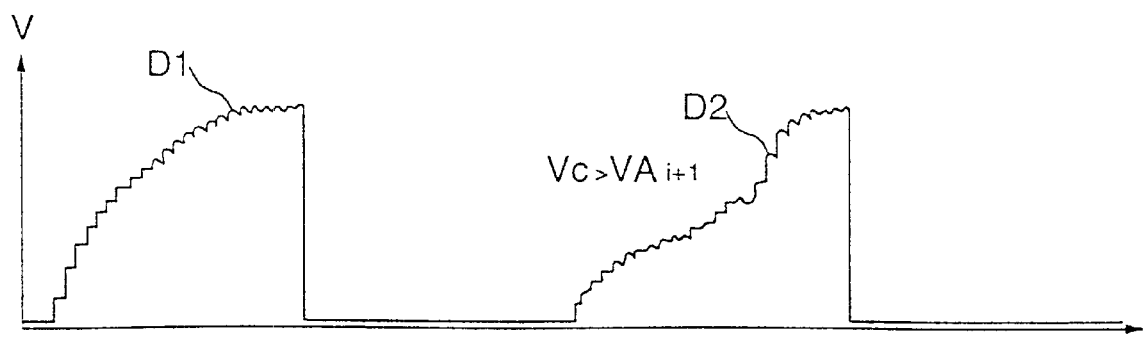
FIG. 5 is a diagram of two consecutive charges of the charge pump of FIG. 1 according to the prior art.
Figure 7:
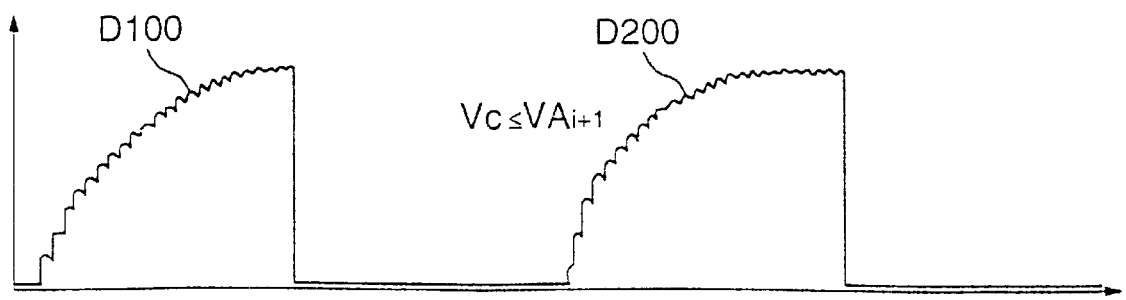
FIG. 7 is a diagram of two consecutive charges of the charge pump according to the invention.

FIG. 7 shows two successive charge cycles of pump D100 and D200 in which starting-up means 300 have been implemented as explained previously between the two activations. A perfect symmetry between activation D100 and D200 can be observed, unlike activation D2 of FIG. 5 obtained with a charge pump used without the starting-up means of the invention.

A charge pump according to the invention may already be protected upon starting-up with a single stage or a sub-assembly of stages among stages 1 to N fitted with the aforecited starting-up means. Preferably, all the stages include these starting-up means.

Figure 8:
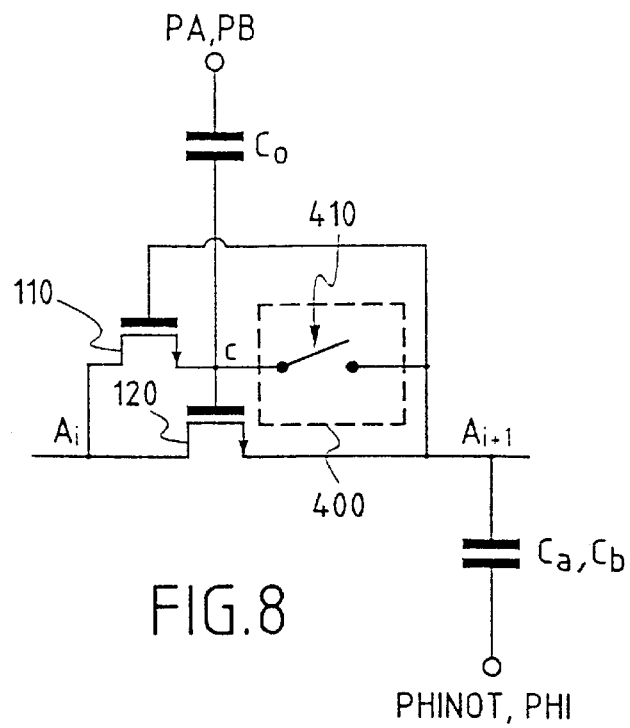
FIG. 8 is an electric diagram of a stage of a charge pump device according to a second embodiment of the invention.

FIG. 8 shows a stage of a charge pump fitted with starting-up means 400 according to a second embodiment of the invention. In this second embodiment, node c is connected to node $A_{i+1}$ by a switch 410 which, when it is closed, short-circuits node c with node $A_{i+1}$. Potential Vc at node c is then close to potential $VA_{i+1}$, at node $A_{i+1}$ which prevents the gate potential of transistor 120 from being greater than the source potential of the same transistor. In these conditions, transistor 120 cannot be in the conducting state and thus fulfils the necessary state condition of transistor 12 upon starting-up the pump, i.e. being in a non conducting state. Such an embodiment provides the same charge reliability results as those shown in FIG. 7. As for the first embodiment, this charge pump may include, one, several or all its stages fitted with switch 410 according to the desired conditions of use.

The first and second embodiments were described in relation to a switching circuit 100, 200 which operates in forward current (transistors 100 and 120 of N type channel).

Figure 9:
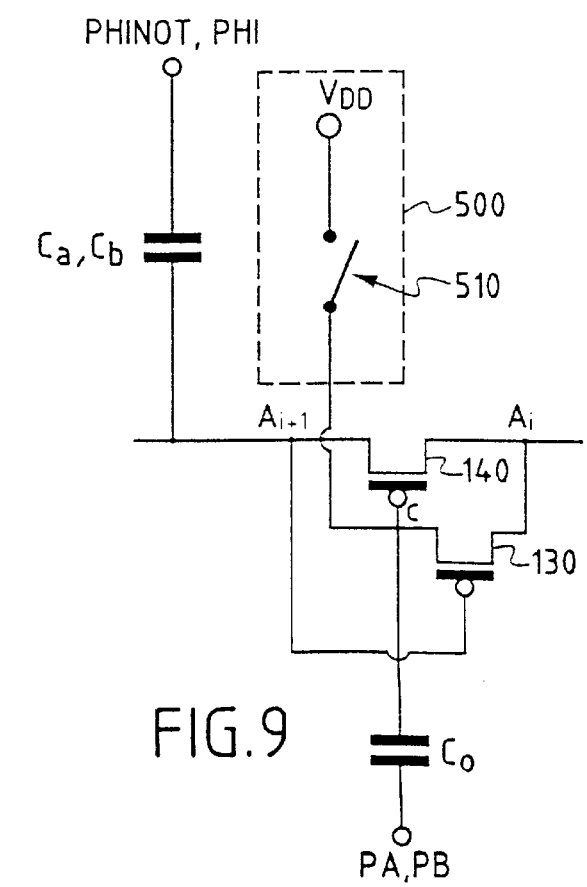
FIG. 9 is an electric diagram of a stage of a charge pump device according to a third embodiment of the invention.

FIG. 9 shows a stage of a charge pump fitted with starting-up means 500 according to a third embodiment of the invention. This third embodiment corresponds to the operation of switching circuit 100, 200 in reverse current in the charge pump with respect to the corresponding operation of the first and second embodiments. In this type of operation, switching circuit 100, 200 of each stage includes a first and a second reverse channel (channel P) transistor 130, 140 with respect to transistors 110, 120. Consequently, the conditions required for protected starting-up of the pump are also reversed. In other words, the potential Vc of the gate of transistor 140 must be higher than or equal to potential $VA_{i+1}$ of node $A_{i+1}$ to place the transistor in the non conducting state. For this purpose starting-up means 500 are formed of a switch 510 arranged between node c and a positive potential $V_{DD}$ in this third embodiment. Thus, by closing switch 510, node c is set at a potential which is higher than potential $VA_{i+1}$ causing the non conducting state of transistor 140 before any starting-up of the charge pump. This third embodiment has the same performance as that described for the first and second embodiments according to the invention.

Switching circuit 100, 200 can be implemented with insulated gate field effect transistors (MOS) as well as with bipolar transistors or junction field effect transistors (FET).

What is claimed is:

1. A charge pump device including, in a cascade arrangement, a plurality of stages for transferring a potential charge from one stage to the next in response to clock signals, each stage including, arranged between an input and an output, a switching circuit and a storage capacitor, said switching circuit being formed of a first transistor and a second transistor, each transistor having a gate, a drain and a source, the drains of the first and second transistors being connected to the input of the stage, the source of the first transistor being connected to the gate of the second transistor and the source of the second transistor being connected to output of the stage and to the gate of the first transistor, wherein at least one of the stages further includes starting-up means at a junction node of said source of the first transistor with said gate of the second transistor, said starting-up means being arranged for keeping said second transistor in a non conducting state between two activation cycles of said charge pump device, said charge pump device operating in forward current wherein said node has a given potential and wherein said starting-up means include means for keeping said given potential at a value less than or equal to that of a potential at the output of said stage, and wherein the starting-up means include a switch arranged between the junction node and the output of said stage.

2. A charge pump device including, in a cascade arrangement, a plurality of stages for transferring a potential charge from one stage to the next in response to clock signals, each stage including, arranged between an input and an output, a switching circuit and a storage capacitor, said switching circuit being formed of a first transistor and a second transistor, each transistor having a gate, a drain and a source, the drains of the first and second transistors being connected to the input of the stage, the source of the first transistor being connected to the gate of the second transistor and the source of the second transistor being connected to output of the stage and to the gate of the first transistor, wherein at least one of the stages further includes starting-up means at a junction node of said source of the first transistor with said gate of the second transistor, said starting-up means being arranged for keeping said second transistor in a non conducting state between two activation cycles of said charge pump device, said charge pump device operating in reverse current wherein said node has a given potential and wherein said starting-up means include means for keeping said given potential at a value greater than or equal to that of a potential at the output of said stage, and wherein the starting-up means include a switch arranged between the junction node and the output of said stage.

3. A charge pump device according to claim 1, wherein each stage of said plurality of stages includes said starting-up means.

4. A charge pump device according to claim 2, wherein each stage of said plurality of stages includes said starting-up means.

* * * * *